3,179,711
METHOD OF PREPARING SYNTHETIC LUBRICATING OIL

Donald H. Antonsen, Glen Mills, Pa., assignor to Sun Oil Company, Philadelphia, Pa., a corporation of New Jersey
No Drawing. Filed Dec. 3, 1962, Ser. No. 241,517
9 Claims. (Cl. 260—683.15)

This invention relates to the preparation of synthetic lubricating oils having unusually high viscosity indexes and low pour points by the polymerization of certain straight chain alpha olefins by means of a particular type of catalyst system.

The are various special applications for lubricating oils in which it is highly desirable that the oil employed have an especially high viscosity index, for example, a V.I. above 130. The oil also should have a low pour point, e.g., below $-30°$ F., high oxidation stability and lubricating properties that provide good wear characteristics. One such application is in the lubrication of jet aircraft wherein conditions of both low and high temperature may be encountered. Other special applications in which lubricants having such characteristics are desirable are automatic transmission lubrication, high temperature hydraulic applications and brake fluids. Lubricating oils that can be derived from petroleum generally do not have the combination of properties desired for these special applications.

Lubricating oils having viscosity indexes considerably higher than for those normally derived from petroleum have been prepared heretofore by the polymerization of various olefins. In the prior art several catalyst systems have been disclosed for effecting this reaction to produce oily polymers. Aluminum chloride is one of the catalysts that has been used for this purpose (Montgomery et al. United States Patent No. 2,559,984). This catalyst promotes reaction by a cationic type of mechanism, and accordingly it not only effects polymerization of the olefin but also causes isomerization of both the olefin monomer before polymerization and the polymerization product. This is disadvantageous, since the polymer products obtained in systems where isomerization occurs have lower viscosity indexes than would result in the absence of isomerization.

Garwood United States Patent No. 2,937,129 discloses the use of another type of catalyst system for producing polymeric lubricating oils, namely, ditertiary alkyl peroxides. This type of catalyst promotes reactions by a free radical mechanism and it also has the disadvantage of causing isomerization as well as polymerization to occur.

The polymerization of ethylene to oils by utilizing a combination of $TiCl_4$ and an aluminum alkyl halide such as aluminum ethyl sesquichloride has been described in White et al. United States Patent No. 2,993,942. This type of catalyst system contains both anionic and cationic components, and with higher olefins it also will cause isomerization of the olefin monomer and polymer product to occur. With ethylene as the starting olefin, isomerization of the monomer of course cannot take place but the polymer product has such a high pour point that it generally is not a suitable lubricant for the special types of applications referred to above.

The present invention is directed to the preparation of synthetic lubricating oils by the polymerization of alpha olefins utilizing a catalyst system which promotes reaction mainly by an anionic mechanism so that isomerization reactions are minimized. The starting olefin can be any straight chain alpha olefin of the $C_6$–$C_{14}$ range or mixtures thereof. The total oil product boiling above 650° F. that is produced by the reaction generally has a viscosity index above 140 and a pour point substantially below $-50°$ F. The product, after hydrogenation to saturate double bonds in the polymer, has excellent oxidation stability and provides good wear characteristics in lubricating applications.

According to the invention, synthetic lubricating oils are prepared by contacting one or more alpha olefins of the $C_6$–$C_{14}$ range in a liquid reaction medium or solvent at a temperature in the range of 0–50° C. with a catalyst system formed from the following three types of components:

(1) Aluminum alkyl sesquichloride
(2) Titanium tetrachloride
(3) A tetraalkyl silicate The tetraalkyl silicate component of the catalyst system is one in which the alkyl groups each have 1–4 carbon atoms and are unbranched. In other words the alkyl groups can be methyl, ethyl, n-propyl or n-butyl. The four alkyl groups can all be the same or the silicate can contain mixed alkyl groups of the class specified. Thus examples of the silicate component are tetramethyl silicate, tetraethyl silicate, tetra n-butyl silicate, methyl triethyl silicate, diethyl dipropyl silicate and methyl diethyl butyl silicate.

The aluminum-containing component of the catalyst system must be a sesquichloride, as the desired results cannot be obtained with either an aluminum dialkyl monochloride or an aluminum alkyl dichloride. The alkyl group in the sesquichloride can contain, for example, from one to ten carbon atoms and preferably is a straight chain alkyl group. The sesquichloride can contain branched chain alkyl groups such as isobutyl or isopentyl, although this is not preferred. Examples of suitable alkyl groups in the sesquichloride are methyl, ethyl, propyl, n-butyl, n-hexyl, n-octyl and n-decyl.

It is highly important for obtaining the best products in good yield that the three components of the catalyst system be present in certain proportions. In the first place the aluminum alkyl sesquichloride and the titanium tetrachloride should be used in amounts such that the atomic ratio of Al to Ti is in the range of 0.8–2.5 and more preferably 1.0–1.6. At Al:Ti ratios below 0.8, the desired vescosity-temperature characteristics of the product cannot be secured, while at ratios above 2.5 the viscosity-temperature characteristics for the oils are poorer and also there is a tendency to produce solid polymers. Secondly, it is highly important that the amount of tetraalkyl silicate employed in the catalyst system be such that the atomic ratio of O to Al is within a certain narrow range. This range is 0.4:1 to 0.8:1, and the most preferred range is 0.5–0.7. Reduction of the O to Al ratio below 0.4 results in poorer viscosity-temperature characteristics for the product, while an increase of the ratio above 0.8 causes a low yield of product. The most preferable O to Al ratio is about 0.67, as it gives excellent viscosity-temperature characteristics with substantially a maximum yield of product.

The reaction is carried out utilizing a solvent which can be a saturated hydrocarbon or certain types of halohydrocarbons. When a saturated hydrocarbon is used, it can be a paraffinic hydrocarbon, including both n-paraffins and isoparaffins, or a naphthenic hydrocarbon or mixtures thereof. Examples of suitable hydrocarbon solvents are n-pentane, isopentane, hexanes, octanes, decanes, cyclohexane, methylcyclopentane, dimethylcyclohexane and the like. An aromatic hydrocarbon, such as benzene or toluene, should not be used since it causes the formation of too much dimer which boils below the lubricating oil range desired. Also with an aromatic hydrocarbon solvent, there is a tendency to obtain alkylation of the aromatic if even small amounts of water happen to be present in the system.

The types of halohydrocarbons that are suitable as the reaction medium are halobenzenes having 1-2 halogen atoms, trihaloethanes, tetrahaloethanes, trihaloethylenes and tetrahaloethylenes, in which halohydrocarbons the halogen can be either chlorine or fluorine or both. Particularly suitable solvents are the monohalobenzenes, viz. chlorobenzene and fluorobenzene, and dihalobenzenes which are liquid at the reaction temperature such as ortho- and meta-dichlorobenzenes or difluorobenzenes, since with such solvents considerably higher yields of polymer lubricating oil per gram of $TiCl_4$ used are generally obtainable than when a saturated hydrocarbon reaction medium is employed. Examples of other halohydrocarbons that can be used are: methyl chloroform; 1,1,2 - trichloroethane; 1,1,2,2 - tetrachloroethane; trifluoroethanes; chlorodifluoroethanes; tetrafluoroethane; and similar ethylene derivatives containing 3-4 halogen atoms which are chlorine and/or fluorine. The solvent can be used in an amount such that the weight ratio of olefin monomer to solvent is in the range of 5:95 to 95:5 and more preferably 1:2 to 4:1.

The weight proportion of olefin charge to titanium tetrachloride used in the reaction mixture can vary widely. When a saturated hydrocarbon solvent is employed, this ratio should be in the range of 25:1 to 100:1 and the optimum weight ratio generally is in the range of 50:1 to 75:1. At a 50:1 ratio about 85% of the olefin monomer typically is converted to polymer before the catalyst becomes deactivated, while at 100:1 ratio the conversion is about 66% of the monomer. At higher ratios when the solvent is a saturated hydrocarbon practically no more of the monomer is converted than occurs at 100:1. When halohydrocarbons are used as the solvent, the catalyst is generally capable of effecting a greater conversion of the olefin monomer and hence a higher proportion of olefin charge to titanium tetrachloride should be employed, such as a weight ratio of 100:1 to 500:1. For example, when the solvent is chlorobenzene, conversions of the order of 85% are obtainable at ratios up to 200:1, 70% at a 300:1 ratio and 37% at a 400:1 ratio.

The temperature for carrying out the reaction is in the range of 0-50° C. With a saturated hydrocarbon solvent a temperature of 10-30° C. preferably is used, while with a halohydrocarbon solvent the preferred temperature is 25-40° C. The molecular weight of the product tends to increase with increasing reaction temperature. At temperatures below 0° C. substantially no reaction is obtained, while at temperatures above 50° C. the viscosity of the product becomes extremely high and also the catalyst becomes considerably less active.

The following examples are illustrative and show the importance of incorporating the tetraalkyl silicate in the catalyst system in an amount to provide an atomic ratio of O to Al within the range previously specified.

EXAMPLES I-IV

A series of comparative runs was made in which the reaction conditions were identical except that the amount of tetraalkyl silicate incorporated in the catalyst was varied. The silicate used was tetraethyl silicate, the solvent was dried n-hexane and the monomer employed was substantially pure octene-1. A stirred reactor which had been carefully dried was employed. The reaction mixtures were prepared by adding to the reactor, in the order named, n-hexane, ethyl aluminum sesquichloride, $TiCl_4$, tetraethyl silicate (except in Run I) and octene-1. The aluminum, titanium and silicon compounds were each added as a solution in n-hexane. The total amount of n-hexane was 65 ml., the $TiCl_4$ amounted to 2.77 g. and the amount of octene-1 used was 280 g. In each run the atomic ratio of Al to Ti was 1.25. The atomic ratios of O to Al in the runs varied from zero in Run I to 6.8 in Run IV. All runs were carried out at a temperature of about 15° C. for a time of 20 hours. The catalyst was then deactivated by adding to the reaction mixture 20 g. of $Na_2CO_3$, adding 25 ml. of water with thorough mixing and then filtering. The filtrate was topped to remove solvent and unreacted octene. The polymer was then distilled under vacuum to remove the dimer and obtain the lubricating oil polymer as residuum. Results including viscosity and pour point characteristics of the lubricating oil products are shown in the accompanying table.

EXAMPLES V-VI

Two comparative runs were made to show the effect of incorporating tetraethyl silicate in the catalyst when the solvent is chlorobenzene. In each of these runs the reaction mixture contained 181 ml. of chlorobenzene, 300 g. of octene-1, 1.0 g. of $TiCl_4$ and an amount of ethyl aluminum sesquichloride to provide an atomic ratio of Al to Ti of 1.25. In Run V no silicate was used, while in Run VI tetraethyl silicate was included in the catalyst in amount to provide an atomic ratio of O to Al of 0.5. Both runs were carried out at 30° C. for 20 hours. The reaction product was worked up in the same manner as before and the results are also shown in the table.

*Table*

| Run | Atomic Ratios | | Solvent | Conversion of Octene-1, wt. Percent | Wt. Percent Dimer | Higher Polymer | | | |
|---|---|---|---|---|---|---|---|---|---|
| | O:Al | Al:Ti | | | | $KV_{100°}$ | $KV_{210°}$ | V.I. | Pour Pt., °F. |
| I | 0 | 1.25 | Hexane | 76.3 | 17.7 | 25.8 | 5.05 | 137 | −90 |
| II | 0.67 | 1.25 | do | 80.0 | 15.9 | 42.4 | 7.80 | 145 | −90 |
| III | 1.0 | 1.25 | do | 35.0 | 18.3 | 470.0 | 62.4 | 131 | −60 |
| IV | 6.8 | 1.25 | do | 1.0 | | (elastomeric polymer) | | | |
| V | 0 | 1.25 | Chlorobenzene | 80.0 | 19.1 | 26.2 | 5.07 | 135 | −90 |
| VI | 0.5 | 1.25 | do | 69.0 | 16.9 | 30.95 | 6.08 | 147 | −90 |

From the data in the table it can be seen that oil products having viscosity indexes above 140 were obtained only when the O:Al ratio was within the range previously specified (0.4–0.8). Results from the series of runs made with hexane as solvent show that an increase in the O:Al ratio above the desired range causes conversion of the monomer to drop and the oil product to have a viscosity considerably higher than is desirable for most uses. At high O:Al ratios the system has practically no catalytic activity and the small amount of product that may be obtained is an elastomeric polymer rather than oil. By operating with ratios of the catalytic components as herein specified, oils having unusually high viscosity indexes and low pour points can be obtained in good yields. These oils after being hydrogenated have good lubricating characteristics and excellent oxidation stability.

A comparison of Runs II and VI shows that the use of chlorobenzene instead of a saturated hydrocarbon solvent is advantageous in that a considerably higher amount of the desired oil product can be obtained per gram of $TiCl_4$ used. Thus in Run II the grams of desired oil per gram of $TiCl_4$ were 65 as compared to 156 in Run VI.

When other tetraalkyl silicates as herein specified are substituted for tetraethyl silicate, results substantially similar to those shown in the foregoing examples are obtained.

I claim:
1. Method of preparing a synthetic lubricating oil which comprises contacting straight chain alpha olefin of the $C_6$–$C_{14}$ range in a liquid reaction medium selected from the group consisting of saturated hydrocarbons, halobenzenes having 1–2 halogen atoms, trihaloethanes, tetrahaloethanes, trihaloethylenes and tetrahaloethylenes, in which halohydrocarbons the halogen is selected from the group consisting of chlorine and fluorine, at a temperature in the range of 0–50° C. with a catalyst system formed from an aluminum alkyl sequichloride, titanium tetrachloride and a tetraalkyl silicate in which the alkyl groups each have 1–4 carbon atoms and are unbranched, the amounts of the aluminum alkyl sesquichloride and titanium tetrachloride being such that the atomic ratio of Al to Ti is in the range of 0.8–2.5 and the amount of said silicate being such that the atomic ratio of O to Al is in the range of 0.4–0.8, and thereafter separating from the reaction mixture olefin polymer of lubricating oil boiling range.

2. Method according to claim 1 wherein the ratio of O to Al is in the range of 0.5–0.7.

3. Method according to claim 2 wherein the Al to Ti is in the range of 1.0–1.6.

4. Method according to claim 1 wherein said silicate is tetraethyl silicate.

5. Method according to claim 1 wherein the reaction medium is a monohalobenzene.

6. Method according to claim 5 wherein said temperature is in the range of 25–40° C.

7. Method according to claim 1 wherein said sesquichloride is aluminum ethyl sesquichloride.

8. Method of preparing a synthetic lubricating oil which comprises contacting straight chain alpha olefin of the $C_6$–$C_{14}$ range in a liquid reaction medium selected from the group consisting of saturated hydrocarbons, halobenzenes having 1–2 halogen atoms, trihaloethanes, tetrahaloethanes, trihaloethylenes and tetrahaloethylenes, in which halohydrocarbons the halogen is selected from the group consisting of chlorine and fluorine, at a temperature in the range of 0–50° C. with a catalyst system formed from an aluminum alkyl sesquichloride, titanium tetrachloride and tetraethyl silicate, the amounts of the aluminum alkyl sesquichloride and titanium tetrachloride being such that the atomic ratio of Al to Ti is in the range of 1.0–1.6 and the amount of tetraethyl silicate being such that the atomic ratio of O to Al is in the range of 0.5–0.7, and thereafter separating from the reaction mixture olefin polymer of lubricating oil boiling range.

9. Method according to claim 8 wherein the reaction medium is chlorobenzene and the temperature is in the range of 25–40° C.

References Cited by the Examiner
UNITED STATES PATENTS 2,827,447   3/58   Nowlin et al. _____ 260—683.15
3,108,145   10/63   Antonsen _____ 260—683.15

FOREIGN PATENTS 873,067   7/61   Great Britain.

ALPHONSO D. SULLIVAN, *Primary Examiner.*
PAUL M. COUGHLAN, *Examiner.*